(12) United States Patent
Zhang et al.

(10) Patent No.: US 8,040,098 B2
(45) Date of Patent: Oct. 18, 2011

(54) POSITION CONTROLLER

(75) Inventors: Wennong Zhang, Fukuoka (JP); Shoji Takamatsu, Fukuoka (JP); Koji Tomita, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 272 days.

(21) Appl. No.: 12/483,112

(22) Filed: Jun. 11, 2009

(65) Prior Publication Data
US 2009/0251092 A1    Oct. 8, 2009

Related U.S. Application Data

(63) Continuation of application No. PCT/JP2007/073440, filed on Dec. 5, 2007.

(30) Foreign Application Priority Data

Dec. 21, 2006  (JP) ................................. 2006-343748

(51) Int. Cl.
*G05B 11/36*  (2006.01)
(52) U.S. Cl. .................. 318/609; 318/560; 318/610
(58) Field of Classification Search .............. 318/560, 318/609, 610
See application file for complete search history.

(56) References Cited

U.S. PATENT DOCUMENTS

| | | | |
|---|---|---|---|
| 4,914,365 A * | 4/1990 | Murakami et al. | 318/609 |
| 5,691,615 A * | 11/1997 | Kato et al. | 318/609 |
| 6,204,622 B1 * | 3/2001 | Tsuruta | 318/609 |
| 6,252,369 B1 * | 6/2001 | Kaku et al. | 318/609 |
| 6,515,442 B1 * | 2/2003 | Okubo et al. | 318/560 |
| 6,781,340 B2 * | 8/2004 | Tomita | 318/609 |
| 7,224,141 B2 * | 5/2007 | Ide | 318/807 |
| 2004/0239280 A1 | 12/2004 | Zhang et al. | |

FOREIGN PATENT DOCUMENTS

| | | |
|---|---|---|
| JP | 10-314911 | 12/1998 |
| JP | 2003-033066 | 1/2003 |

* cited by examiner

*Primary Examiner* — Walter Benson
*Assistant Examiner* — Kawing Chan
(74) *Attorney, Agent, or Firm* — Ditthavong Mori & Steiner, P.C.

(57) ABSTRACT

A position controller includes a position control part that calculates a speed command on the basis of a difference between a position command and a rotation position of a motor, a PI control part that calculates a torque command on the basis of a speed difference between the speed command and a feedback speed, an observer that generates the feedback speed on the basis of the torque command and a rotation speed of the motor, a phase lead compensator that generates a phase lead compensation signal of the torque command on the basis of the speed command, and an adder that generates a new torque command by adding the phase lead compensation signal of the torque command to the torque command.

2 Claims, 4 Drawing Sheets

POSITION CONTROLLER

CROSS-REFERENCE TO RELATED APPLICATION

The present application is related to PCT patent application Ser. No. PCT/JP2007/073440 titled "Position Controller", and to Japanese Patent application No. 2006-343748 filed at Japan Patent Office titled "Position Controller", all of which are incorporated herein by reference.

BACKGROUND OF THE INVENTION

1. Field of the Invention

The present invention relates to a position controller that causes a feedback position signal to follow a position command.

2. Description of Related Art

When a position controller uses a motor to control driving of a machine, the position controller provides a P-PI (Proportional-Proportional-Integral) minor loop control system which carries out speed control with PI (Proportional-Integral) control by feeding back a rotation speed of the motor, and position control with P (Proportional) control by feeding back a rotation position of the motor.

The position controller improves a response characteristic of a speed control loop by increasing the gain of the PI control of the speed control, and then improves a follow-up characteristic to a position command and a suppression characteristic to a disturbance by increasing a gain of the P control of the position control.

The control system used herein always involves a time delay of calculation and a phase delay of a current loop. Hence, in order to cut high-frequency noise, mechanical vibration, etc., it is necessary to additionally provide an element (delay element) that generates a phase delay, such as a low-pass filter or a notch filter. The position controller having the phase delay of the delay element, however, cannot increase the gain of the PI control of the speed control, resulting in the follow-up characteristic for the position command and the suppression characteristic for the disturbance being poor.

For example, in Japanese Unexamined Patent Application Publication No. 2003-33066, an observer that can compensate the phase delay of the delay element is used, so as to improve the follow-up characteristic for the position command and the suppression characteristic for the disturbance.

SUMMARY OF THE INVENTION

According to an aspect of the invention, a position controller controls driving of a motor and a load machine. The controller includes a position control part that calculates a speed command on the basis of a difference between a position command and a rotation position of the motor; a PI control part or an IP (Integral-Proportional) control part that calculates a torque command on the basis of a difference between the speed command and a feedback speed; an observer including a control object model, which includes a machine movable part model and a delay element model, and an observer compensator, the observer which calculates the feedback speed on the basis of the torque command and a rotation speed of the motor; a phase lead compensator that calculates a phase lead compensation signal on the basis of the speed command; and an adder that calculates a new torque command or a new speed command on the basis of the phase lead compensation signal.

BRIEF DESCRIPTION OF THE DRAWINGS

Exemplary embodiments of the present invention will be described in detail based on the following figures, wherein.

DETAILED DESCRIPTION OF THE PREFERRED EMBODIMENTS

Embodiments of the invention will be described with reference to the figures.

Figure 1:
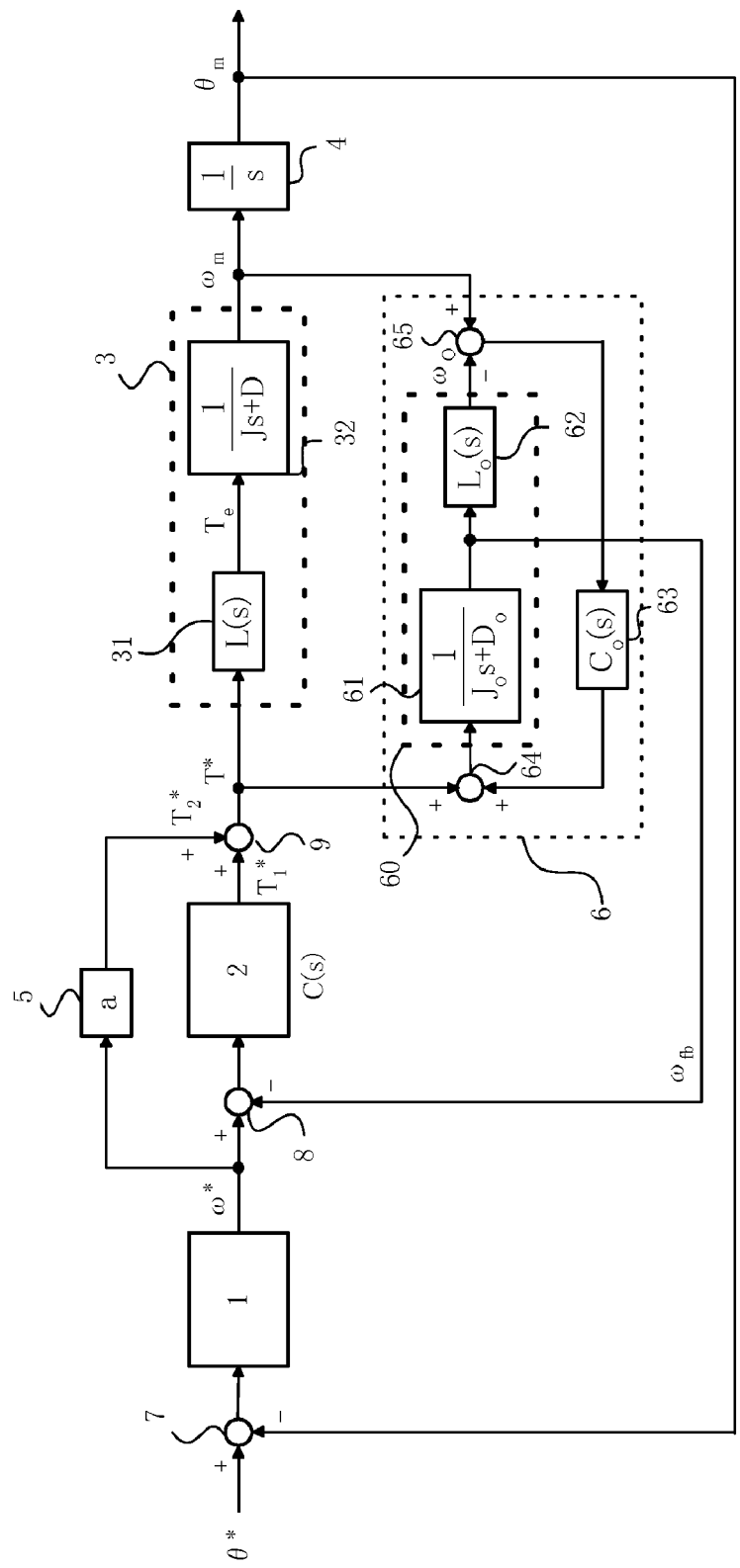
FIG. 1 is a block diagram showing a position controller according to a first embodiment.

FIG. 1 is a block diagram showing a position controller according to a first embodiment of the invention. Referring to FIG. 1, reference numeral 1 denotes a position control part, 2 denotes a PI control part, 3 denotes a control object, 4 denotes an integrator, 5 denotes a phase lead compensator, 6 denotes an observer, 7 and 8 denote subtractors, and 9 denotes an adder.

The control object 3 includes a delay element 31 including, for example, a time delay of calculation, a current loop, a low-pass filter, and/or a notch filter; and a machine movable part 32 including a rotor of a motor (defined by a transfer function from an electromagnetic torque to a rotation speed of the motor).

The observer 6 includes a control object 60 of the observer defined by a machine movable part model 61 and a delay element model 62; and an observer compensator 63.

Also, $\theta^*$ represents a position command, $\omega^*$ represents a speed command, $\theta_m$ represents a rotation position of the motor, $\omega_m$ represents a rotation speed of the motor, $\omega_{fb}$ represents a feedback speed, $T^*$ represents a torque command, J represents an inertia of the machine movable part, D represents a viscous friction coefficient of the machine movable part, and s represents a Laplace operator.

The position controller of the first embodiment including the phase lead compensator 5 and the adder 9, calculates a phase lead compensation signal $T_2^*$ of the torque command by using the phase lead compensator 5 on the basis of the speed command $\omega^*$, and adds the phase lead compensation signal $T_2^*$ of the torque command to a torque command $T_1^*$ by using the adder 9, to calculate a new torque command $T^*$.

Now, the principal of operation of the controller according to the first embodiment will be described.

Figure 2:
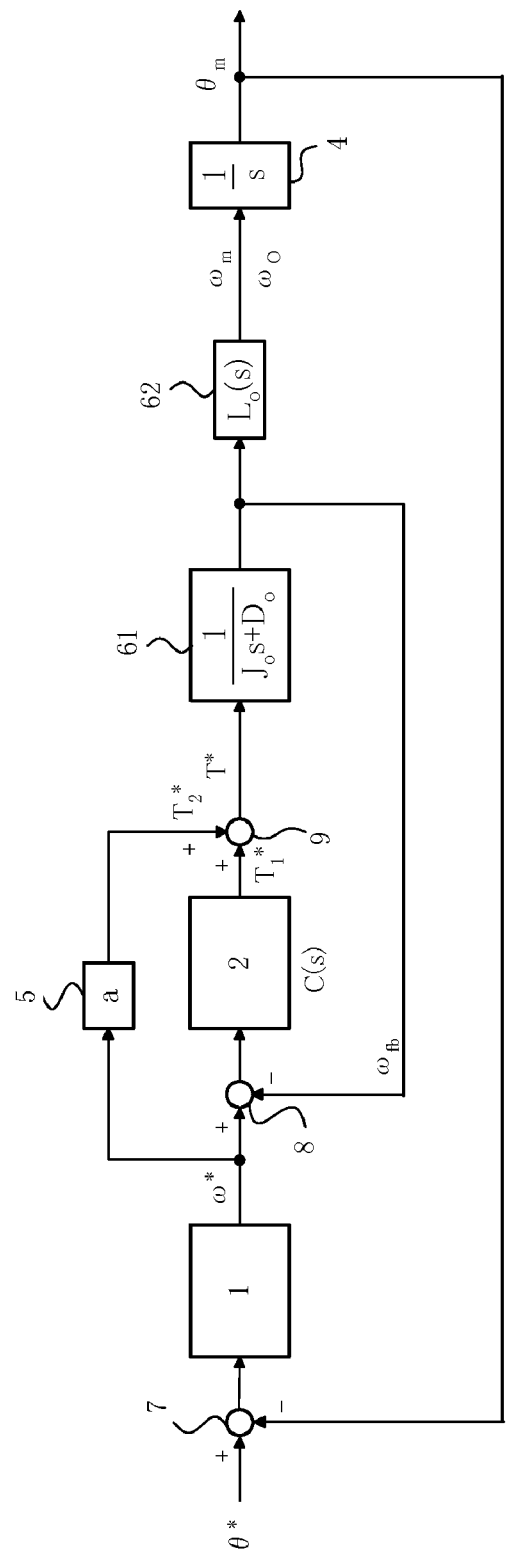
FIG. 2 is an equivalent block diagram showing the position controller of FIG. 1.

FIG. 2 is an equivalent block diagram showing the position controller of FIG. 1. When a model of the control object is correctly identified, i.e., when equations of $L_O(s)=L(s)$ and $P_O(s)=P(s)$ are satisfied, similarly to the related art, the control system in FIG. 1 can be rewritten equivalently as shown in FIG. 2. In FIG. 2, since no delay element is present in the speed loop, the gain of the PI control part 2 can be markedly increased. The response characteristic of the speed control loop can be improved. Although the delay element model 62 having a phase delay is present in the position loop, the phase delay can be compensated by adjusting a gain a of the phase lead compensator 5.

A transfer function of the delay element is approximated as a primary delay filter. The delay element model 62 ($L_O(s)$) is defined by Equation (1). Also, the PI control part 2 ($C(s)$) is defined by Equation (2). When a transfer function ($G_\omega(s)$)

from the speed command $\omega^*$ to the rotation speed $\omega_m$ of the motor is obtained and rearranged, Equation (3) is obtained.

$$L_0(s) = \frac{1}{1+T_L s} \quad (1)$$

$$C(s) = K_p + \frac{K_i}{s} \quad (2)$$

$$G_\omega(s) = \frac{\omega_m(s)}{\omega^*(s)} \quad (3)$$
$$= \frac{(a+K_p)s + K_i}{J_o s^2 + (D_o + K_p)s + +K_i} \cdot \frac{1}{1+T_L s}$$

Also, when the gain (a) of the phase lead compensator 5 is defined by Equation (4), a transfer function from the speed command $\omega^*$ to the rotation speed $\omega_m$ of the motor is defined by Equation (5).

$$a = T_L K_i - K_p \quad (4)$$

$$G_\omega(s) = \frac{\omega_m(s)}{\omega^*(s)} \quad (5)$$
$$= \frac{K_i}{J_o s^2 + (D_o + K_p)s + K_i}$$

In Equation (5), a pole of the primary delay filter is canceled. By adjusting the proportional gain $K_p$ and the integral gain $K_i$ of the PI control part 2, a pole of $G_\omega(s)$ can be arranged at a desired position. That is, a cut frequency of a response characteristic of the rotation speed $\omega_m$ of the motor with respect to the speed command $\omega^*$ can be sufficiently highly set. Accordingly, the gain of the position control part 1 can be markedly increased so that the response of the rotation position $\theta_m$ of the motor with respect to the position command $\theta^*$ does not cause an overshoot. Also, by increasing the gain of the position control part 1, the follow-up characteristic for the position command and the suppression characteristic for the disturbance can be improved.

Figure 3:
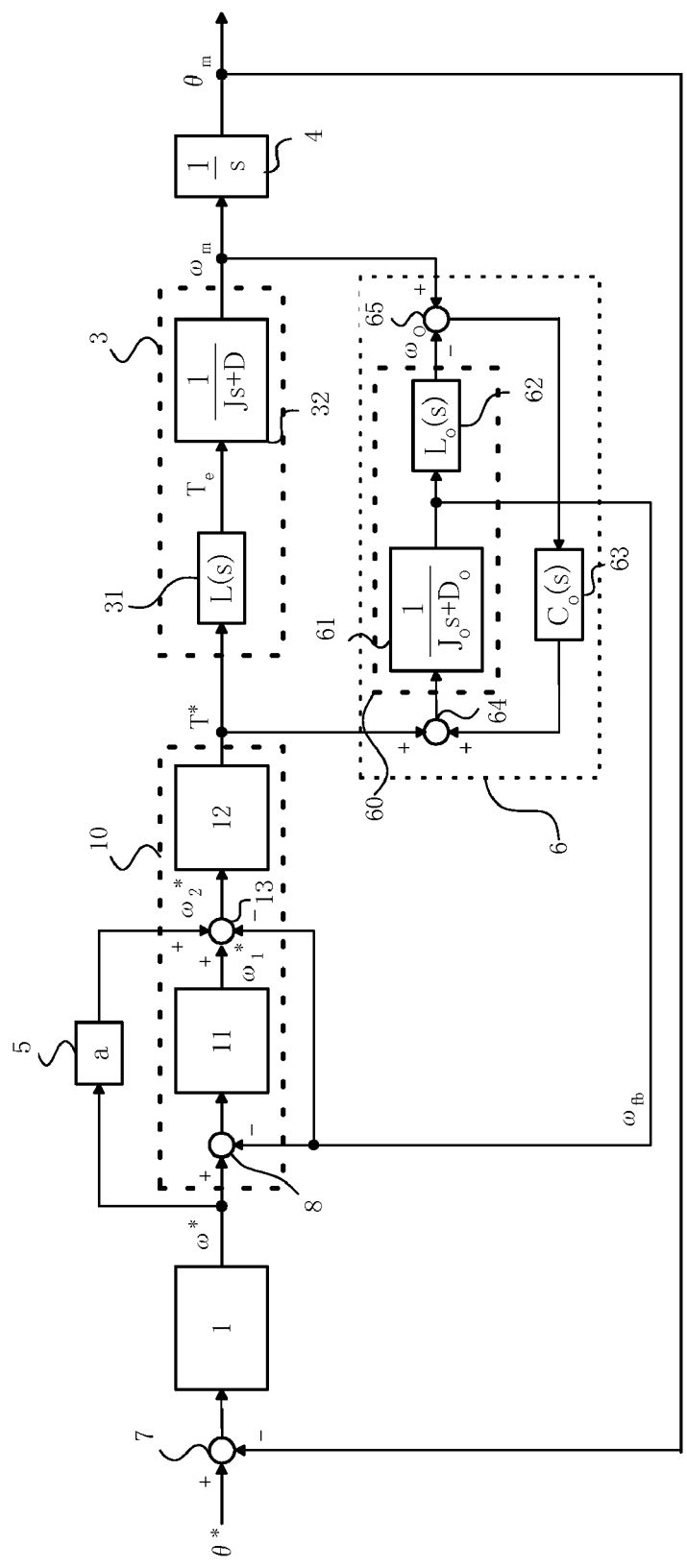
FIG. 3 is a block diagram showing a position controller according to a second embodiment.

FIG. 3 is a block diagram showing a position controller according to a second embodiment of the invention. Referring to FIG. 3, reference numeral 10 denotes an IP control part, 11 denotes an integral control part, 12 denotes a proportional control part, and 13 denotes an adder-subtractor. Other structures refer reference numerals corresponding to those in FIG. 1, and redundant description will be omitted. The second embodiment of the invention differs from the first embodiment in that the IP control part 10 is used instead of the PI control part 2, that the phase lead compensator 5 calculates a phase lead compensation signal $\omega_2^*$ of the speed command, that the adder-subtractor 13 adds the phase lead compensation signal $\omega_2^*$ of the torque command to the proportional part speed command $\omega_1^*$ and then subtracts a feedback speed from the resultant value to calculate a new proportional part speed command.

Now, the principal of operation of the controller according to the second embodiment will be described.

Figure 4:
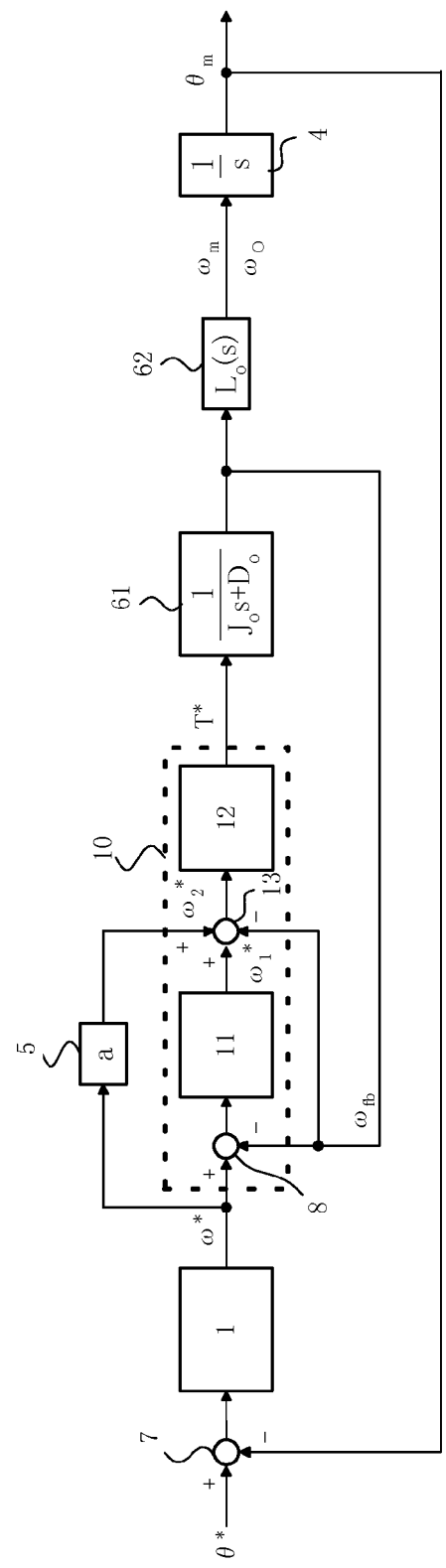
FIG. 4 is an equivalent block diagram showing the position controller of FIG. 3.

FIG. 4 is an equivalent block diagram showing the position controller of FIG. 3. When a model of the control object is correctly identified, i.e., when equations of $L_O(s)=L(s)$ and $P_O(s)=P(s)$ are satisfied, similarly to the first embodiment, the control system in FIG. 3 can be rewritten equivalently as shown in FIG. 4. In FIG. 4, since no delay element is present in the speed loop, the gain of the IP control part 10 can be markedly increased. The response characteristic of the speed control loop can be improved. Although the delay element model 62 having a phase delay is present in the position loop, the phase delay can be compensated by adjusting a gain a of the phase lead compensator 5.

A transfer function of the delay element is approximated as a primary delay filter. The delay element model 62 is defined by Equation (6). Also, when it is assumed that Ki represents a gain of the integral control part 11 and Kp is a gain of the proportional control part 12, and when a transfer function from the speed command $\omega^*$ to the rotation speed $\omega_m$ of the motor is obtained and rearranged, Equation (7) is obtained.

$$L_0(s) = \frac{1}{1+T_L s} \quad (6)$$

$$G_\omega(s) = \frac{\omega_m(s)}{\omega^*(s)} \quad (7)$$
$$= \frac{(as + K_i)K_p}{J_o s^2 + (D_o + K_p)s + K_i K_p} \cdot \frac{1}{1+T_L s}$$

Also, when the gain of the phase lead compensator 5 is defined by Equation (8), a transfer function from the speed command $\omega^*$ to the rotation speed $\omega_m$ of the motor is defined by Equation (9).

$$a = T_L K_i \quad (8)$$

$$G_\omega(s) = \frac{\omega_m(s)}{\omega^*(s)} \quad (9)$$
$$= \frac{(as + K_i)K_p}{J_o s^2 + (D_o + K_p)s + K_i K_p}$$

In Equation (10), a pole of the primary delay filter is canceled. By adjusting the proportional gain $K_p$ and the integral gain $K_i$ of the IP control part 2, a pole of $G_\omega(s)$ can be arranged at a desired position. That is, a cut frequency of a response characteristic of the rotation speed $\omega_m$ of the motor with respect to the speed command $\omega^*$ can be sufficiently highly set. Accordingly, the gain of the position control part 1 can be increased so that the response of the rotation position $\theta_m$ of the motor with respect to the position command $\theta^*$ does not cause an overshoot. Also, by increasing the gain of the position control part 1, the follow-up characteristic for the position command and the suppression characteristic for the disturbance can be improved.

With the above-described embodiments, by combining the phase lead compensator, the phase delay in the position loop is compensated, the gain of the position control part is markedly increased, and hence, the high-speed and high-precision follow-up characteristic for the position command without an overshoot, and the powerful suppression characteristic for the disturbance can be provided.

With the position controller of the embodiments, by combining the observer and the phase lead compensator to the typical minor loop control system, the phase delay of the delay element of the control system is compensated, and high-performance target follow-up control can be provided. The position controller of the invention does not have to be applied to a motor driver, and may be applied to a control system in which a feedback signal follows a target signal.

What is claimed is:

1. A position controller that controls driving of a motor and a load machine, comprising:
   a position control part that calculates a speed command on the basis of a difference between a position command and a rotation position of the motor;
   a PI control part that calculates a torque command on the basis of a difference between the speed command and a feedback speed;
   a phase lead compensator that calculates a phase lead compensation signal of the torque command on the basis of the speed command;
   an adder that calculates a new torque command by adding the phase lead compensation signal of the torque command to the torque command; and
   an observer that receives the new torque command and a rotation speed of the motor, inputs a value obtained by subtracting an output of a delay element model from the rotation speed of the motor into an observer compensator, inputs a value obtained by adding an output of the observer compensator to the new torque command into a machine movable part model, inputs an output of the machine movable part model into the delay element model, and outputs the output of the machine movable part model as the feedback speed,
   wherein the delay element model is defined by a primary delay filter, and
   wherein a gain of the phase lead compensator is a value obtained by subtracting a proportional gain of the PI control part from a value in which a time constant of the primary delay filter is multiplied by an integral gain of the PI control part.

2. A position controller that controls driving of a motor and a load machine, comprising:
   a position control part that calculates a speed command on the basis of a difference between a position command and a rotation position of the motor;
   an integral control part that calculates a proportional part speed command on the basis of a difference between the speed command and a feedback speed;
   a proportional control part that calculates a torque command on the basis of a difference between the proportional part speed command and the feedback speed;
   an observer that receives the torque command and a rotation speed of the motor, inputs a value obtained by subtracting an output of a delay element model from the rotation speed of the motor into an observer compensator, inputs a value obtained by adding an output of the observer compensator to the torque command into a machine movable part model, inputs an output of the machine movable part model into the delay element model, and outputs the output of the machine movable part model as the feedback speed;
   a phase lead compensator that calculates a phase lead compensation signal of the speed command on the basis of the speed command; and
   an adder-subtractor that calculates a new proportional part speed command by adding the phase lead compensation signal of the speed command to the proportional part speed command and then by subtracting the feedback speed from the resultant value,
   wherein the delay element model is defined by a primary delay filter, and
   wherein a gain of the phase lead compensator is a value obtained by multiplying a time constant of the primary delay filter by a gain of the integral control part.

* * * * *